Patented May 10, 1932

1,857,161

UNITED STATES PATENT OFFICE

WILLIAM HENRY MOSS, OF CUMBERLAND, MARYLAND, ASSIGNOR TO CELANESE CORPORATION OF AMERICA, A CORPORATION OF DELAWARE

METHOD OF COATING AND PRODUCT THEREOF

No Drawing. Application filed May 22, 1929. Serial No. 365,244.

This invention relates to the coating of surfaces with lacquers containing derivatives of cellulose and relates more particularly to the application of a primer coat or filling coat to such surfaces prior to the application of the lacquer.

An object of my invention is to prepare a suitable filler or primer for the coating of surfaces that are not smooth in order to prepare the same for the application of lacquers containing derivatives of cellulose. Other objects of my invention will appear from the following detailed description.

In the application of lacquers to rough or porous surfaces such as wood it is first necessary to apply a filler or primer coat to the same. The ordinary filler which comprises a coating composition containing drying oils and natural resins is not suitable for use when lacquers containing organic derivatives of cellulose are to be applied, since the films formed from such lacquers do not adhere well to the filler or primer coat of the above composition. The same is true of shellac or other fillers of this nature. If attempts are made to apply the lacquer directly to the untreated surface, it is not possible completely to fill the grain of the wood in a satisfactory manner, since such lacquers contain only about 20 to 30% of solid constituents when the same is applied to the surface, and when the volatile solvents of the lacquer evaporate, the film formed therefrom shrinks down into the crevices so that the grain is easily seen again. If the film from the lacquer bridges the grain without filling it, air bubbles are formed thereunder, and these air bubbles may cause many difficulties.

I have found that if a substance is used as a filler, which substance may be in the form of a paste or freely flowing solution, and which contains a substantial proportion of a nondrying oil that is at least partially compatible with the film formed from the lacquer subsequently to be applied, very satisfactory results are obtained.

In accordance with my invention I coat a surface that is not smooth with a filler or priming coat, which is in the form of a paste or liquid, a substantial proportion of which is a nondrying oil that is at least partially compatible with the film formed from the lacquer to be applied. This primer may also contain a small quantity of plastifiers and/or synthetic resins compatible with the derivative of cellulose that is employed in the lacquer subsequently to be applied. The primer preferably contains pigments or other filling materials and also volatile solvents.

The surfaces to be coated in accordance with my invention are preferably such surfaces that require the application of a primer or filling coat. Such surfaces may be made of either hard or soft wood, ceramic material such as pottery, china or brick, stoneware, concrete, or even metallic surfaces that are not smooth. These surfaces may first be stained to a desired color, if desired. The articles to be treated may be any suitable ones such as furniture, walls, receptacles, machines, vehicles, etc.

The filler or primer material in accordance with my invention may be applied in any suitable manner. Thus if it is in the form of a paste, it may be applied by rubbing the same onto the surfaces or by pressing the same onto such surfaces as desired. If it is in the form of a liquid, it may be applied by brushing, spraying, dipping or in any other suitable manner.

Any suitable nondrying oil that is at least partially compatible with the derivatives of cellulose employed in the lacquer to be subsequently applied may be used in the filler or primer composition. While I prefer to employ cocoanut oil, any other nondrying oils that are at least partially compatible with the derivative of cellulose, or the fatty acids thereof may be employed.

The plastifiers that may be employed in making the primer in accordance with this invention may be any suitable ones such as camphor, triacetin, diethyl phthalate, dibutyl phthalate, diethyl tartrate, dibutyl tartrate, monomethyl xylene sulfonamid, the ethyl toluene sulfonamides (meta, ortho or para), etc.

If desired, any suitable pigment or mineral filling material may be added, examples of which are lamp-black, China clay (aluminum silicate), silex ($SiO_2$) or the other pigments used in making paint. As stated, synthetic resins compatible with the derivatives of cellulose employed in the lacquer to be applied, as described below, may be added, but preferably the amount of such resin employed is small in order to avoid difficulties in subsequent drying.

The nondrying oils and the other ingredients are incorporated in such quantities of volatile solvent to form a paste or a freely flowing solution as is desired. Any suitable volatile solvent may be employed, examples of which are gasoline, benzine, Varnoline, acetone, benzene, toluene, xylene, etc., or mixtures of these. The specific solvent chosen will depend on the nature of the material employed.

After application of the primer or filler in accordance with my invention, a suitable lacquer containing a derivative of cellulose may then be applied. This lacquer may contain any suitable derivative of cellulose, a synthetic resin compatible with the derivative of cellulose, plastifiers, and suitable solvents. The derivative of cellulose employed may be an inorganic derivative of cellulose such as cellulose nitrate or an organic derivative of cellulose such as organic esters of cellulose or cellulose ethers. Examples of organic esters of cellulose are cellulose acetate, cellulose formate, cellulose propionate and cellulose butyrate while examples of cellulose ethers are ethyl cellulose, methyl cellulose and benzyl cellulose. Examples of synthetic resins that may be employed are the fusible and soluble phenol formaldehyde resins prepared in the presence of an acid catalyst, diphenylol propane formaldehyde resins, toluene sulfonamid-formaldehyde resins, etc. The plastifiers employed in making the lacquer may be any suitable ones such as those described above. The solvent mixture preferably contains low boiling solvents such as acetone, alcohol, benzene, etc., medium boiling solvents such as dioxan, monomethyl ether of eythlene glycol or ethyl lactate, and high boiling solvents such as diacetone alcohol, benzyl alcohol, etc.

After the filler is applied to the surfaces, and allowed to dry for sufficient period, which will vary with the nature and amount of volatile solvent employed, all pores or grains of the surfaces are well filled, and after the lacquer is applied, a smooth satisfactory film is formed.

In order further to illustrate my invention, but without being limited thereto, the following specific examples are given.

*Example I*

The following is an example of a suitable primer or filler which may be employed.

|  | Parts by weight |
|---|---|
| Cocoanut oil | 20 |
| China clay | 32 |
| Silex (silica) | 10.7 |
| Carbon black | 7.1 |
| Gasoline | 30 |

*Example II*

The following is an example of a primer made in accordance with my invention, which primer also contains a plastifier.

|  | Parts by weight |
|---|---|
| Cocoanut oil | 7 |
| Diethyl phthalate | 22 |
| China clay | 22 |
| Silex | 9.6 |
| Carbon black | 6.4 |
| Gasoline | 32 |

After application of either of the above fillers, the same is allowed to stand for 10 minutes and the excess filler is then rubbed off and after standing for awhile, a suitable lacquer may be employed, and an example of such lacquer is as follows:

*Example A*

|  | Parts by weight |
|---|---|
| Cellulose acetate | 57 |
| Diphenylol propane resin | 57 |
| Diethyl phthalate | 22.8 |
| Acetone | 232 |
| Benzene | 145 |
| Alcohol | 102 |
| Ethyl lactate | 152 |

If desired, pigments in suitable proportions may be added to the above lacquer.

It is to be understood that the foregoing detailed description is given merely by way of illustration, and that many variations may be made therein without departing from the spirit of my invention.

Having described my invention, what I claim and desire to secure by Letters Patent is:

1. In the method of coating surfaces with lacquers containing derivatives of cellulose, the step of applying to such surfaces a primer or filler containing cocoanut oil.

2. In the method of coating surfaces with lacquers containing cellulose acetate, the step of applying to such surfaces a primer or filler containing cocoanut oil.

3. The method of coating wood surfaces comprising applying to such surfaces a primer or filler containing cocoanut oil and then applying a lacquer containing an organic derivative of cellulose.

4. The method of coating wood surfaces comprising applying to such surfaces a primer or filler containing cocoanut oil and then applying a lacquer containing cellulose acetate.

5. The method of coating wood surfaces comprising applying to such surfaces a primer or filler containing cocoanut oil and a mineral filling material and then applying a lacquer containing cellulose acetate.

6. An article of manufacture having at least on part of the surface thereof a coat formed by the application of a primer containing cocoanut oil.

7. An article of manufacture having at least on part of the surface thereof a coat formed by the application of a primer containing cocoanut oil and a film formed from a lacquer containing cellulose acetate superposed thereon.

In testimony whereof, I have hereunto subscribed my name.

WILLIAM HENRY MOSS.